(12) United States Patent
Masuyama (10) Patent No.: US 8,451,482 B2
(45) Date of Patent: May 28, 2013

(54) PRINTING SYSTEM AND PRINTING METHOD

(75) Inventor: Yuka Masuyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 509 days.

(21) Appl. No.: 12/749,347

(22) Filed: Mar. 29, 2010

(65) Prior Publication Data
US 2010/0265539 A1    Oct. 21, 2010

(30) Foreign Application Priority Data
Apr. 17, 2009    (JP) .................. 2009-101378

(51) Int. Cl.
*G06F 3/12* (2006.01)
*G06K 15/00* (2006.01)

(52) U.S. Cl.
USPC ......... 358/1.15; 358/1.14; 358/1.16; 358/402

(58) Field of Classification Search
None
See application file for complete search history.

(56) References Cited

U.S. PATENT DOCUMENTS

| | | | |
|---|---|---|---|
| 6,369,909 B1 | 4/2002 | Shima | |
| 6,940,615 B1 * | 9/2005 | Shima | ........................ 358/1.15 |
| 2002/0154328 A1 | 10/2002 | Sato | |
| 2003/0090697 A1 | 5/2003 | Lester et al. | |
| 2003/0128402 A1 * | 7/2003 | Tanimoto | ...................... 358/402 |
| 2004/0100649 A1 * | 5/2004 | Johnson et al. | ............... 358/1.14 |
| 2005/0068546 A1 | 3/2005 | Kuo et al. | |
| 2007/0146772 A1 | 6/2007 | Castellani | |

FOREIGN PATENT DOCUMENTS

| | | |
|---|---|---|
| JP | 7281847 A | 10/1995 |
| JP | 2002312140 A | 10/2002 |

OTHER PUBLICATIONS

U.S. Appl. No. 12/683,801, filed Jan. 7, 2010, Yuka Masuyama.
Extended European Search Report dated Dec. 7, 2012 issued in corresponding European Patent Application No. 10160066.6.

* cited by examiner

*Primary Examiner* — Marivelisse Santiago Cordero
*Assistant Examiner* — Huo Long Chen
(74) *Attorney, Agent, or Firm* — Fitzpatrick, Cella, Harper & Scinto

(57) ABSTRACT

A printing apparatus and print control apparatus exchange and acquire unique apparatus information. The print control apparatus determines whether it can process data received from an information processing apparatus. When the print control apparatus determines that it cannot process the data, it transfers the data to the printing apparatus based on the acquired apparatus information, and notifies the information processing apparatus that the print control apparatus has not processed the data. The printing apparatus determines whether it can process data received from the information processing apparatus. When the printing apparatus determines that it cannot process the data, it transfers the data to the print control apparatus based on the acquired apparatus information, and notifies the information processing apparatus that the printing apparatus has not processed the data.

4 Claims, 11 Drawing Sheets

PRINTING SYSTEM AND PRINTING METHOD

BACKGROUND OF THE INVENTION

1. Field of the Invention

The present invention relates to a printing system and a printing method for printing a document.

2. Description of the Related Art

Conventionally, an external print control apparatus (print controller) is connected to a printing apparatus via a local network such as Ethernet® and can be identified by a single piece of apparatus information (e.g., IP address). All data is sent to the printing apparatus via the print control apparatus. Hence, processible print data is only that described in a printer description language compatible with the print control apparatus. Even if the printing apparatus can copy with a different printer description language, its function cannot be exploited (Japanese Patent Laid-Open No. 2002-312140).

However, even in the arrangement in which an external print control apparatus is connected to a printing apparatus, a need is arising to input a job directly to the printing apparatus and make best use of the function of the printing apparatus. For this purpose, the print control apparatus and printing apparatus need to hold different pieces of apparatus information. With two different pieces of apparatus information held in the print control apparatus and printing apparatus, these apparatuses can receive and process different print data. Further, data using a function such as FAX or BOX processible by the printing apparatus can be sent directly to the printing apparatus.

When a print server, a plurality of printing apparatuses and a plurality of information processing apparatuses are connected to a network and a designated printing apparatus is not available, data is transferred to another printing apparatus on the network (Japanese Patent Laid-Open No. 7-281847). According to this method, the print server monitors and manages the use status of printing apparatuses in order to increase the use efficiency of those that are present on the network.

However, at this time, if the print server sets the wrong apparatus information, data is transmitted to an apparatus a user of the information processing apparatus does not intend and printing will fail.

SUMMARY OF THE INVENTION

An aspect of the present invention is to eliminate the above-mentioned problems with the conventional technology.

The present invention provides a printing system and a printing method for improving the user friendliness of the printing system by transmitting data to an apparatus the user of an information processing apparatus originally intends even if the user sets the wrong apparatus information.

The present invention in its first aspect provides a printing system in which an information processing apparatus that designates print processing for a document, a printing apparatus that prints the document, and a print control apparatus that controls the printing apparatus are connected to each other via a network, the printing apparatus and the print control apparatus being arranged to exchange and acquire unique apparatus information, the system comprising;

in the print control apparatus, a first notification unit configured to determine whether the print control apparatus can process data received from the information processing apparatus, and on a determination that the print control apparatus cannot process the data, the print control apparatus is arranged to transfer the data to the printing apparatus, based on the acquired apparatus information, and to notify the information processing apparatus that the print control apparatus has not processed the data; and in the printing apparatus, a second notification unit configured to determine whether the printing apparatus can process data received from the information processing apparatus, and on a determination that the printing apparatus cannot process the data, the print apparatus is arranged to transfer the data to the print control apparatus, based on the acquired apparatus information, and to notify the information processing apparatus that the printing apparatus has not processed the data.

The present invention in its second aspect provides a printing method executed in a printing system in which an information processing apparatus that designates print processing for a document, a printing apparatus that prints the document, and a print control apparatus that controls the printing apparatus are connected to each other via a network, the method comprising the steps of:

causing the printing apparatus and the print control apparatus to exchange and acquire unique apparatus information;

causing the print control apparatus to determine whether the print control apparatus can process data transmitted from the information processing apparatus, and when determining that the print control apparatus cannot process the data, transfer the data to the printing apparatus, based on the acquired apparatus information, and notify the information processing apparatus that the print control apparatus has not processed the data; and causing the printing apparatus to determine whether the printing apparatus can process data transmitted from the information processing apparatus, and when determining that the printing apparatus cannot process the data, transfer the data to the print control apparatus, based on the acquired apparatus information, and notify the information processing apparatus that the printing apparatus has not processed the data.

The present invention can improve the user friendliness of the printing system by transmitting print data to an apparatus the user of an information processing apparatus originally intends even if he sets wrong apparatus information.

Further features of the present invention will become apparent from the following description of embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts and a repetitive description thereof will be omitted.

First Embodiment

System Configuration

Figure 1A:
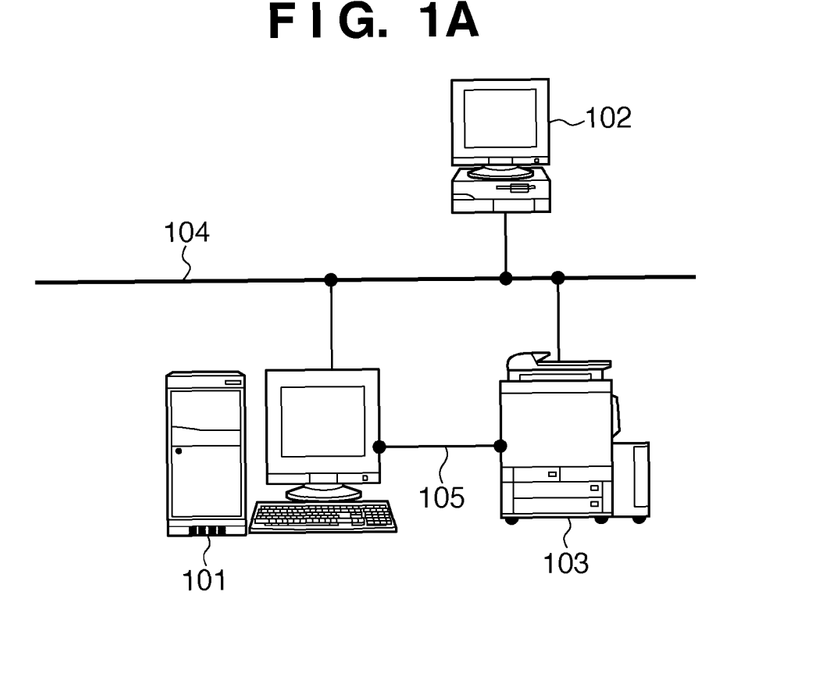
FIG. 1A is a view showing an example of the overall configuration of a printing system.

FIG. 1A is a view showing the overall configuration of a printing system in the first embodiment. A print control apparatus 101 which controls a printing apparatus 103 is connected to a LAN 104 serving as a network. The LAN 104 is laid between an information processing apparatus 102 which designates print processing for a document, the print control apparatus 101, and the printing apparatus 103 which prints. A LAN 105 is connected between the printing apparatus 103 and the print control apparatus 101 via a network interface. The printing apparatus 103 is further connected to the LAN 104 via a network interface.

The print control apparatus 101 and printing apparatus 103 have different pieces of apparatus information. The apparatus information is information unique to an apparatus and is, e.g., an IP address. Data transmitted from the information processing apparatus 102 to the print control apparatus 101 propagates through the LAN 104 and is received by the print control apparatus 101. After RIP processing, the data propagates through the LAN 105 to the printing apparatus 103, and then is output from it. Similarly, data transmitted from the information processing apparatus 102 to the printing apparatus 103 propagates through the LAN 104, and is received and processed by the printing apparatus 103. The LAN 104 allows the connection of other information processing apparatuses and printing apparatuses.

Figure 1B:
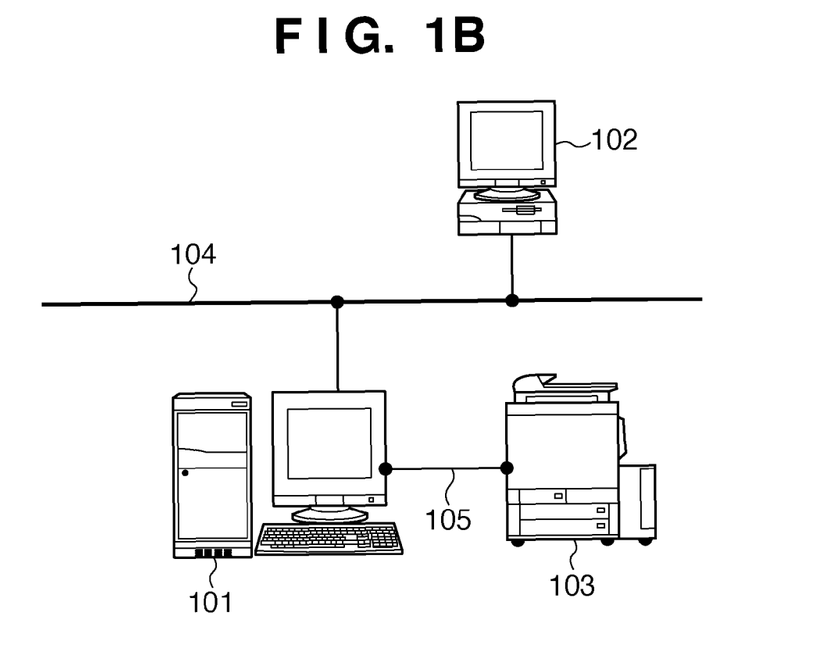
FIG. 1B is a view showing another example of the overall configuration of the printing system.

FIG. 1B shows the configuration of a conventional printing system including a print control apparatus and printing apparatus. In the conventional printing system, the printing apparatus 103 is not connected to the LAN 104 and only the print control apparatus 101 is connected to the LAN 104. The information processing apparatus 102 sets the IP address of the print control apparatus 101 and inputs data to the print control apparatus 101. Data processible by the printing apparatus 103 propagates through the LAN 105 and is received by the printing apparatus 103.

<Arrangement of Print Control Unit (Printer Controller)>

Figure 2:
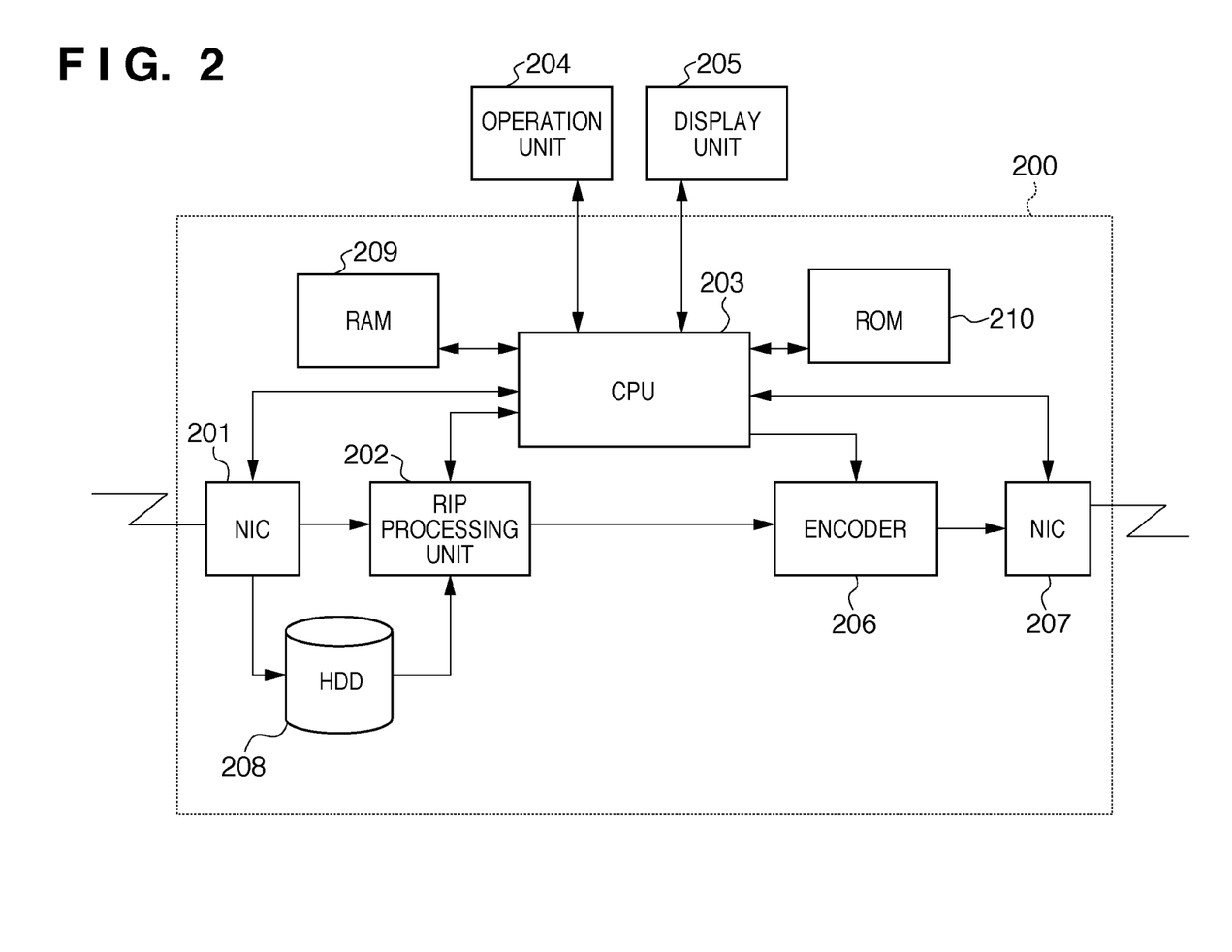
FIG. 2 is a block diagram showing an arrangement of a print control unit (controller)

FIG. 2 is a block diagram exemplifying the arrangement of a print control unit (controller) in the embodiment. Referring to FIG. 2, a NIC (Network Interface Card) 201 is the first network interface for connecting the print control unit to the LAN 104. A RIP processing unit 202 converts a received printer description language such as PDL into a raster image. A CPU 203 controls the whole print control apparatus. An encoder 206 converts raster image data into print data or a data format in a form supported by the printing apparatus 103. A NIC 207 is the second network interface for connecting the print control unit to the LAN 105. An HDD (Hard Disk Drive) 208 stores system software for a variety of processes, input image data, and the like. A RAM 209 is a system work memory used when the CPU 203 runs, and temporarily stores input image data. A ROM 210 is a boot ROM which stores a system boot program. An operation unit 204 includes buttons, keys, and a touch panel and allows a user to manipulate the print control apparatus. A display unit 205 presents information by an image and text to the user.

<Arrangement of Printing Apparatus>

Figure 3:
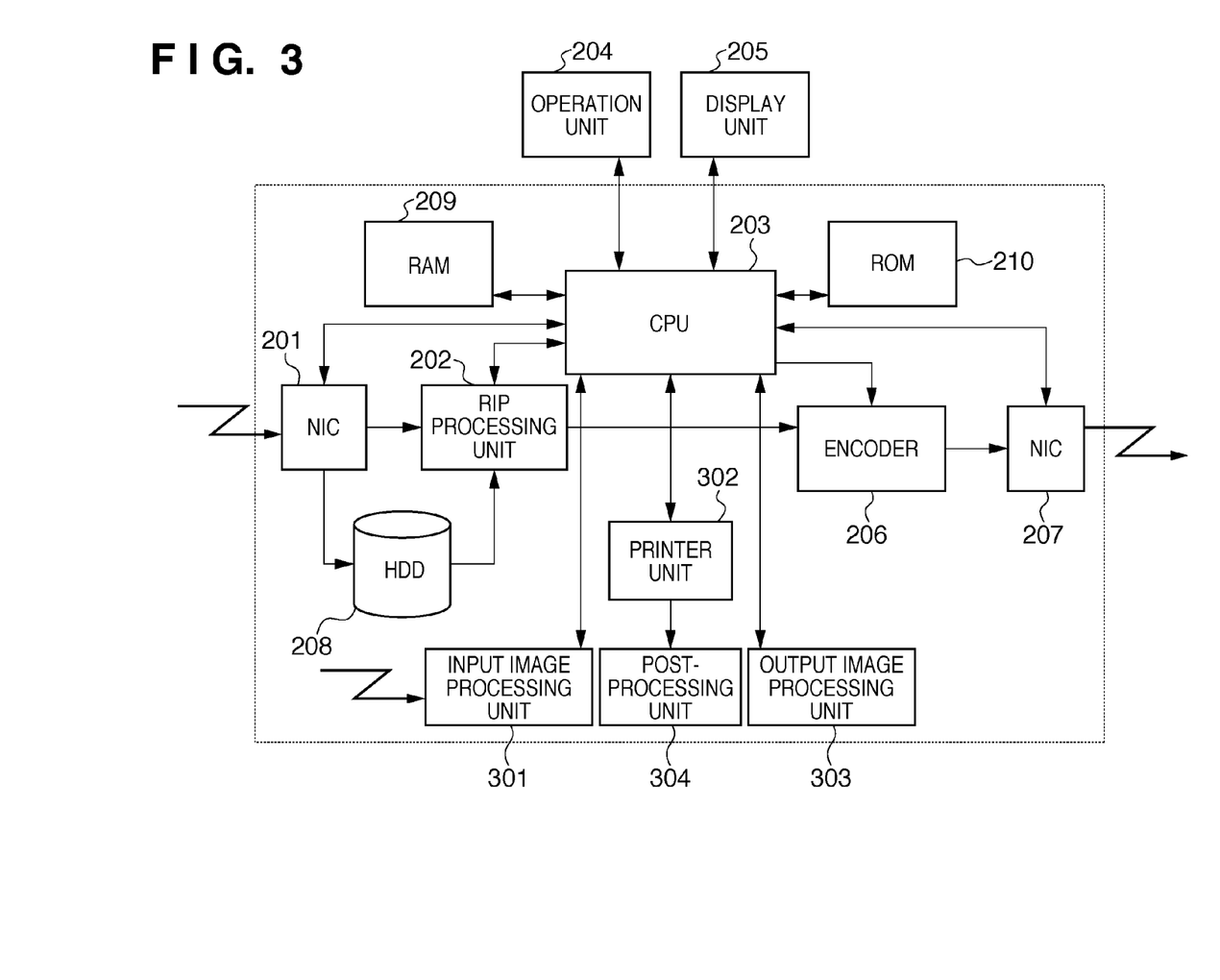
FIG. 3 is a block diagram showing an arrangement of a printing apparatus.

FIG. 3 is a block diagram showing an arrangement of the printing apparatus. The printing apparatus 103 may be, for example, an MFP (Multi Function Peripheral) having multiple functions such as a scanner function and print function. An input image processing unit 301 reads a paper document or the like with an image reading device such as a scanner, and processes the read image data. An output image processing unit 303 performs image processing for printing, and sends the processed data to a printer unit 302. The printer unit 302 feeds a sheet serving as a print medium, and sequentially prints image data processed by the output image processing unit on the sheet. The printed sheet is sent to a post-processing unit 304, and undergoes sheet sorting processing and sheet finishing processing.

The information processing apparatus 102 shown in FIGS. 1A and 1B is, for example, a general-purpose PC including memories such as a ROM, RAM, and HDD in addition to a CPU.

<Various Processing Sequences in Embodiment>

A case will be explained, in which the print control apparatus 101 and printing apparatus 103 cope with different printer description languages. And a user set first IP address of the print control apparatus 101 and second IP address of the printing apparatus 103 in a printer driver installed in the information processing apparatus 102. However, if the first and the second IP address are wrong (The fact is that the first IP address is for the printing apparatus 103 and the second IP address is for the print control apparatus 101.), print data is not transmitted to a destination the user wants. In the conventional system configuration, the print control apparatus and printing apparatus did not hold IP addresses different from each other, so data were rarely transmitted to a wrong IP address. However, such a case would occur because the print control apparatus and printing apparatus hold different IP addresses now.

Figure 4:
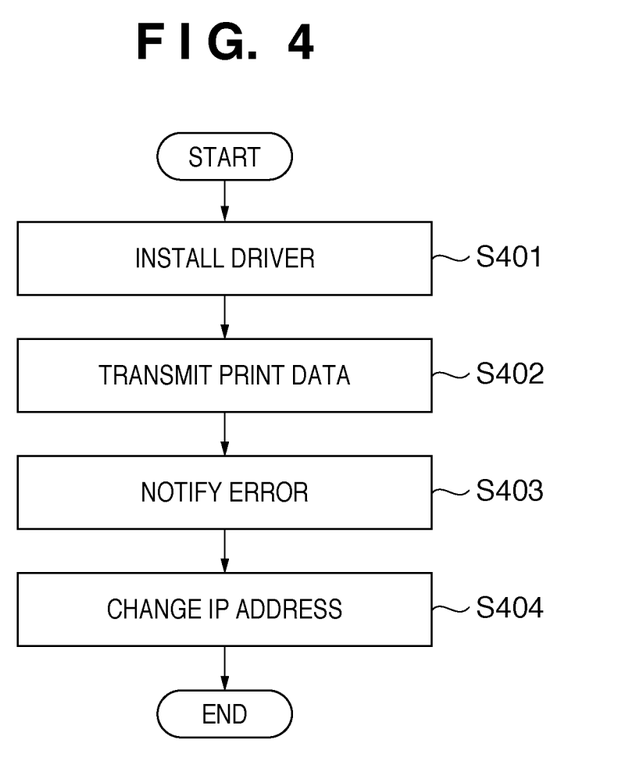
FIG. 4 is a flowchart showing processing procedures when a wrong IP address is set.

FIG. 4 is a flowchart showing processing procedures by the information processing apparatus when a printer driver is installed in the information processing apparatus 102, a wrong IP address is set in the printer driver, and print data is transmitted. In S401, the printer driver is installed with the IP address of the print control apparatus 101 or printing apparatus 103 in accordance with an instruction from the user. The print control apparatus 101 and printing apparatus 103 have different IP addresses. Even if the printer driver of the print control apparatus 101 is installed, the IP address of the printing apparatus 103 may be set. Reversely, even if the printer driver of the printing apparatus 103 is installed, the IP address of the print control apparatus 101 may be set.

At this time, the information processing apparatus 102 cannot determine that a wrong IP address has been set. In S402, therefore, the information processing apparatus 102 directly transmits print data to the destination of the IP address set in S401. In S403, the information processing apparatus 102 receives an error message from the destination of the IP address to which the data has been transmitted. In S404, the information processing apparatus 102 changes the IP address registered in the printer driver in accordance with an IP address change instruction from the user.

Figure 5:
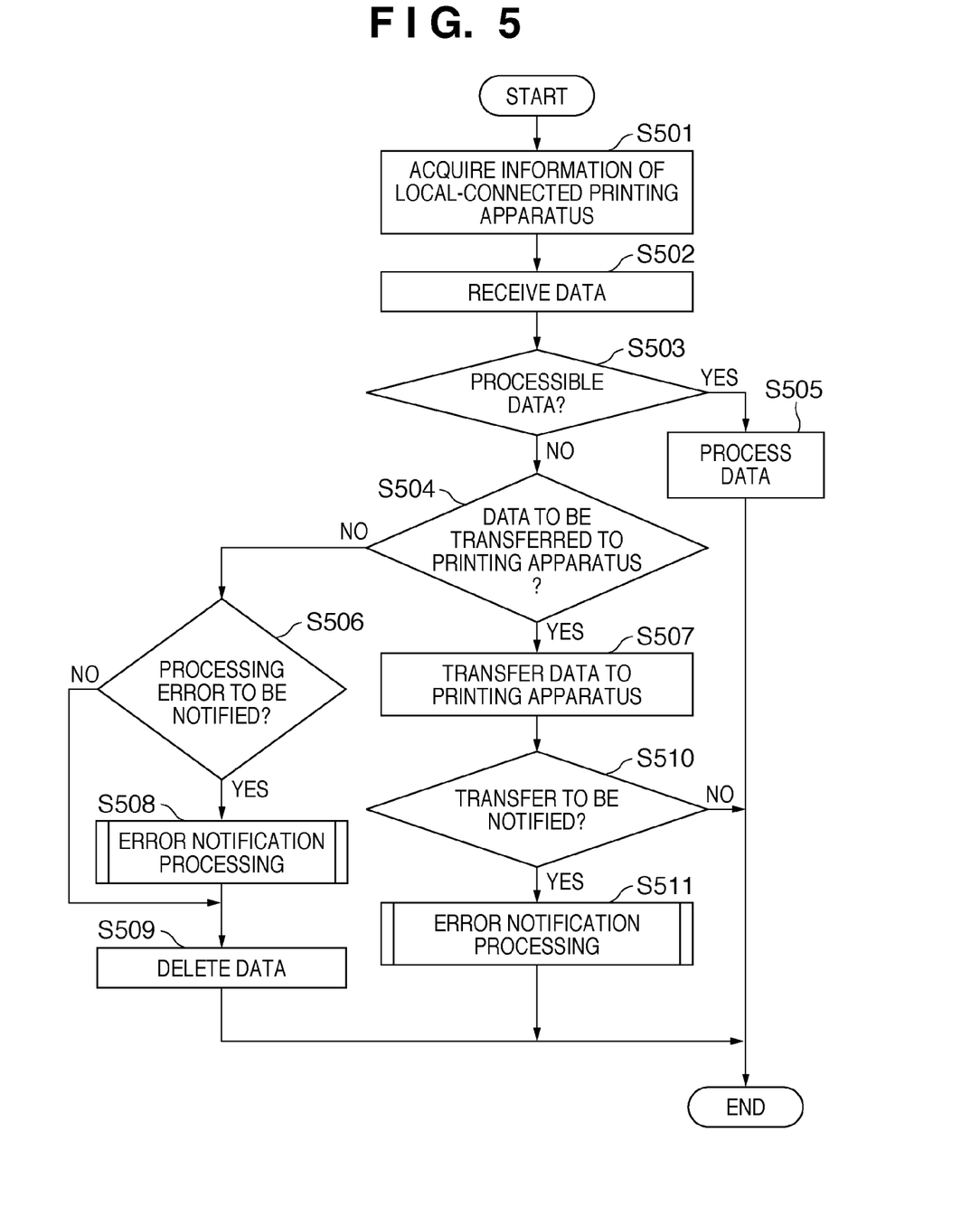
FIG. 5 is a flowchart showing the procedures of transfer processing from the print control apparatus to the printing apparatus.

FIG. 5 is a flowchart showing processing procedures when the print control apparatus 101 receives data which should be originally transmitted to the printing apparatus 103, and transfers the print data to the printing apparatus 103. In S501, the print control apparatus 101 acquires apparatus information of the printing apparatus 103. The apparatus information includes at least information indicating the IP address of the printing apparatus and the performance of the printing apparatus 103 such as a compatible printer description language. The print control apparatus 101 acquires these kinds of information immediately after it is activated and becomes communicable with the printing apparatus 103. In the embodiment, the print control apparatus 101 and printing apparatus 103 exchange their apparatus information upon activation, and each apparatus acquires partner's apparatus information. In S502, the print control apparatus 101 receives print data from the information processing apparatus 102.

In S503, the print control apparatus 101 determines whether the print data received in S502 is data processible by the print control apparatus 101. If the print control apparatus 101 determines that the received print data is data processible by the print control apparatus 101, it advances to S505; if NO, to S504. In S505, the print control apparatus 101 performs normal data processing for the print data.

In S504, the print control apparatus 101 determines whether to transfer the received print data to the printing apparatus 103. This determination complies with a transfer processing mode set in FIG. 7 (to be described later). If the print control apparatus 101 determines not to transfer the received print data, it advances to S506. If the print control apparatus 101 determines to transfer the received print data, it advances to S507.

In S506, the print control apparatus 101 determines whether to notify the user that the received print data has not been processed. This determination complies with an error notification setting selected in FIG. 8 (to be described later). If the print control apparatus 101 determines not to notify the user of the error, it advances to S509. If the print control apparatus 101 determines to notify the user of the error, it advances to S508. In S508, the print control apparatus 101 performs error notification processing. In S509, the print control apparatus 101 deletes the received print data from it.

In S507, the print control apparatus 101 transfers the print data to the printing apparatus 103. In S510, the print control apparatus 101 determines whether to notify the information processing apparatus 102 that the print control apparatus 101 has transferred the print data to the printing apparatus 103. This determination complies with error notification setting contents shown in FIG. 8. If the print control apparatus 101 determines to notify the information processing apparatus 102 that the print data has been transferred, it advances to S511; if NO, ends the processing. In S511, the print control apparatus 101 executes error notification processing, similar to S508. This sequence is done even when the printing apparatus 103 transfers received print data to the print control apparatus 101.

<Error Notification Sequence>

Figure 6:
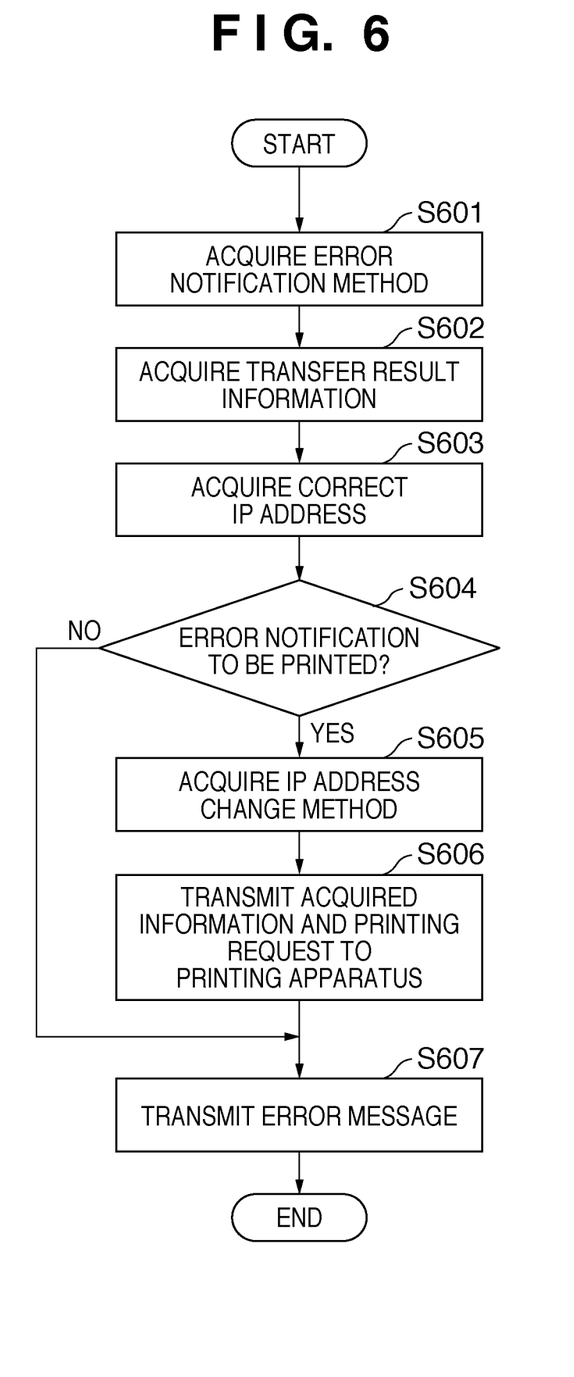
FIG. 6 is a flowchart showing processing procedures when the print control apparatus notifies an information processing apparatus of an error.

FIG. 6 is a flowchart showing processing procedures when the print control apparatus 101 transfers received print data to the printing apparatus 103 and notifies the information processing apparatus 102 of an error. In S601, the print control apparatus 101 acquires error notification setting contents shown in FIG. 8. In S602, the print control apparatus 101 acquires transfer result information indicating that data has been transferred to a correct IP address, or has not been transferred to it and deleted. In S603, the print control apparatus 101 acquires a correct IP address from apparatus information of the printing apparatus 103 that has been acquired in S501 of FIG. 5.

In S604, the print control apparatus 101 determines whether to print an error notification. If the user has selected printing of an error notification page at a setting 802 shown in FIG. 8, the print control apparatus 101 advances to S605; if NO, to S607. In S605, the print control apparatus 101 acquires an IP address change method. In S606, the print control apparatus 101 transmits information to the printing apparatus 103 and requests it to print, in order to print the acquired correct IP address and IP address change method on the error notification page. In S607, the print control apparatus 101 transmits an error message to the information processing apparatus 102 to display it. In the embodiment, notifying the information processing apparatus 102 of an error message by performing the processing shown in FIG. 6 by the print control apparatus 101 will be defined as the first notification. Notifying the information processing apparatus 102 of an error message by performing the processing shown in FIG. 6 by the printing apparatus 103 will be defined as the second notification.

In this processing, when the printing apparatus 103 transfers received print data to the print control apparatus 101 and prints an error notification, it outputs the acquired correct IP address and IP address change method in S606 without transmitting them to the print control apparatus 101.

<Setting of Processing Mode between Print Control Apparatus and Printing Apparatus>

Figure 7:
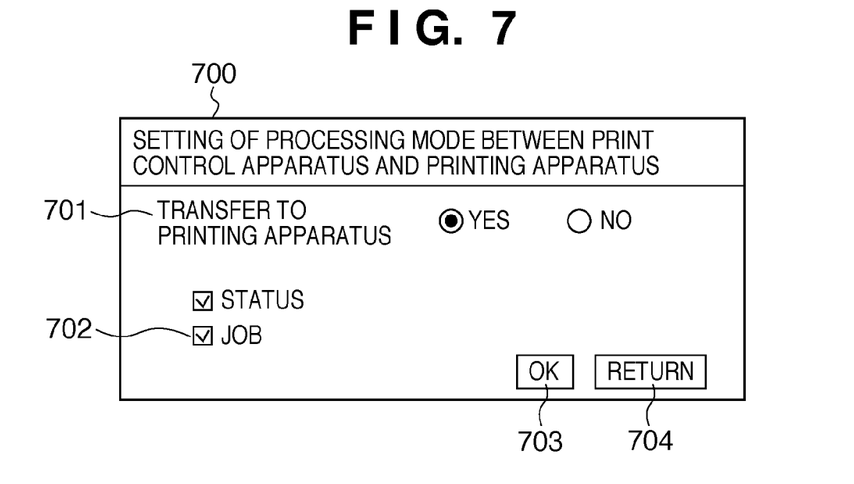
FIG. 7 is a view showing a window for setting transfer processing between the print control apparatus and the printing apparatus.

FIG. 7 shows a setup window which can be set by the print control apparatus 101 in order to set transfer processing between the print control apparatus 101 and the printing apparatus 103. A setting 701 in a window 700 is used to determine whether to perform transfer processing from the print control apparatus 101 to the printing apparatus 103. A setting 702 is used to set whether data to be transferred contains status data and print job data when the user sets execution of transfer at the setting 701. Data set at the setting 702 is transferred to the printing apparatus 103. An OK button 703 is used to set items selected in the window 700 and close the setup window. A button 704 is used to invalidate selected items and return to a previous window. Also in the printing apparatus 103, processing of transferring data from the printing apparatus 103 to the print control apparatus 101 can be set in a similar setup window.

Figure 8:
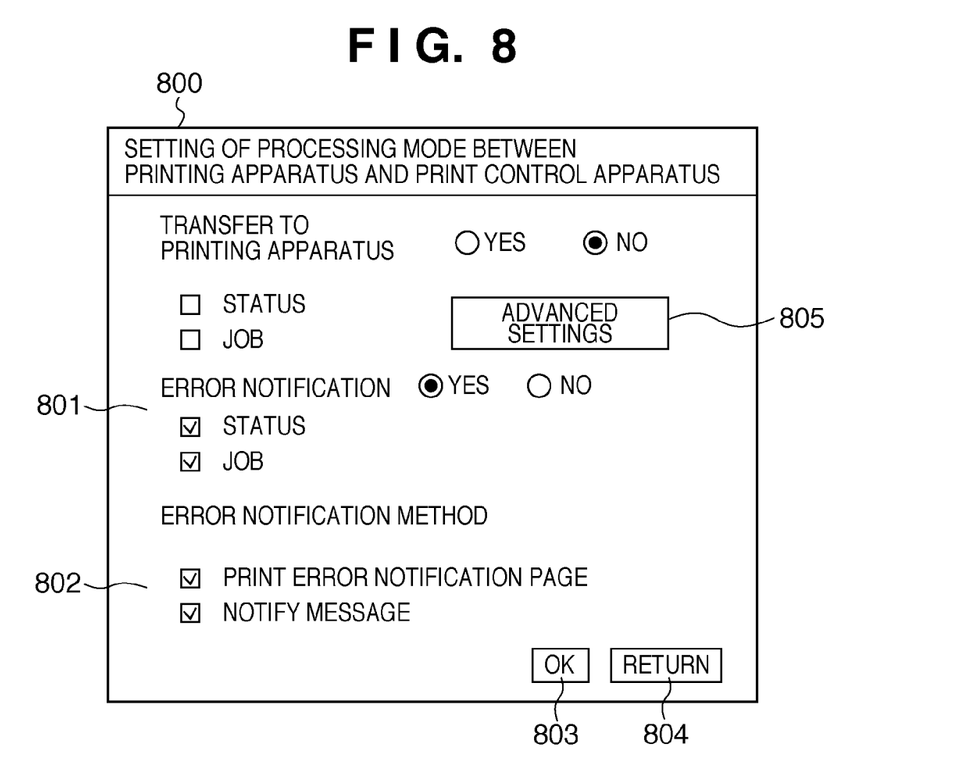
FIG. 8 is a view showing a window for setting details of transfer processing and an error notification.

In an example shown in FIG. 8, a setting button 805 and settings 801 and 802 for advanced settings of transfer processing can be set in addition to the settings 701 and 702 shown in FIG. 7. The setting button 805 is pressed to open a window 1200 for advanced settings of transfer conditions in FIG. 12. The setting 801 is used to set whether to send an error notification for processing set at the setting 701. When the user selects execution of transfer processing at the setting 701 and execution of the error notification at the setting 801, the print control apparatus 101 transfers data to the printing apparatus 103, and displays an error notification window 901 on the information processing apparatus 102 to notify him of an error. If the user selects no execution of transfer at the setting 701 and execution of the error notification at the setting 801, the print control apparatus 101 displays an error notification window 904 on the information processing apparatus 102 to notify him of an error without performing transfer processing.

Figure 10:
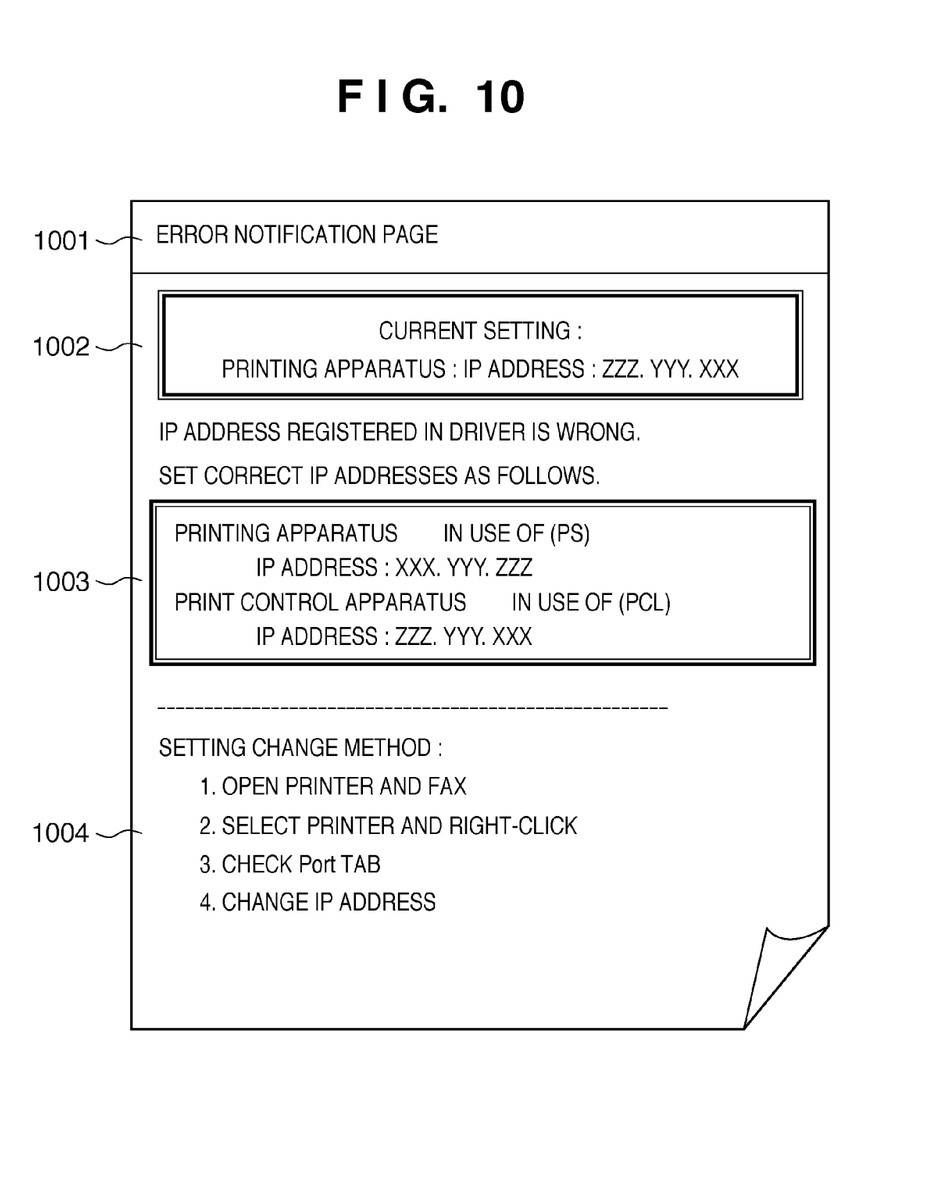
FIG. 10 is a view exemplifying an output error notification page.

At the setting 801, the user can select in check boxes whether data for the error notification contains either or both of status data and print data. At the setting 802, the user selects in check boxes either or both of error notification page printing and message notification as the error notification method. FIG. 10 exemplifies a printed error notification page. An OK button 803 is used to save settings in a window 800 and close the setup window. A return button 804 is used to invalidate settings in the window 800 and close the setup window.

Figure 9A:
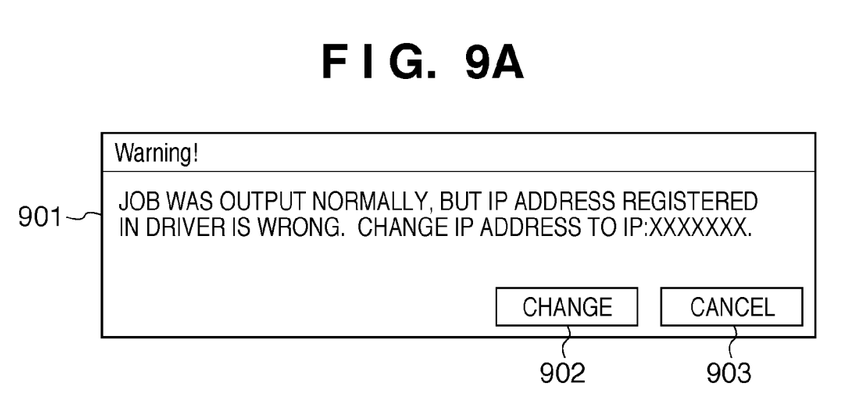
FIG. 9A is a view showing an example of a message in the error notification.
Figure 9B:
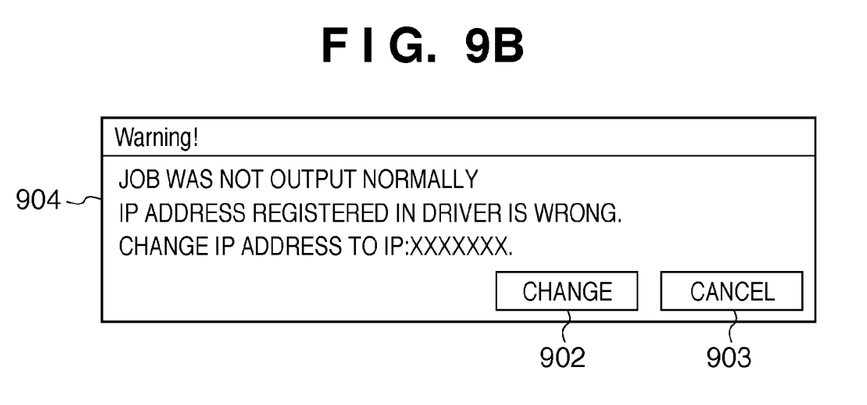
FIG. 9B is a view showing another example of the message in the error notification.

FIG. 9A is a view exemplifying a message notification when the user selects execution of transfer processing and execution of the error notification at the setting 801. A button 902 is used to display a setup window for changing an IP address to a correct one. A button 903 is pressed to close the error message window without changing the IP address. FIG. 9B is a view exemplifying an error notification window when no transfer processing is executed. Even when no transfer processing is done, a correctly set IP address is displayed, facilitating a change of the IP address by the user.

FIG. 10 exemplifies an error notification page 1001 output when the user selects error notification page printing as the error notification method at the setting 802 of FIG. 8. A part 1002 presents the current settings of an apparatus and IP address in the printer driver of the information processing apparatus 102. A part 1003 presents a correct combination of an IP address and apparatus. A part 1004 presents an IP address change method.

By printing the error notification page and notifying the user that the IP address setting is wrong, he can be notified in detail of the cause of the error and how to cancel the error. In addition to the error messages as shown in FIGS. 9A and 9B, the error notification page may be output at the top of a printed material. When the user goes to the printing apparatus 103 to pick up the printed material, he can be more reliably notified that the IP address needs to be changed. The error notification page 1001 bears only the part 1002 for the current settings, the part 1003 for a correct IP address combination, and the part 1004 for the IP address setting method. However, the error notification page 1001 is not limited to these kinds of information, and other kinds of information are also printable, as needed.

Second Embodiment

In the first embodiment, only execution/non-execution of transfer processing set in the processing mode (setting 701) between the print control apparatus and the printing apparatus is checked in transfer. In this case, however, if execution of transfer processing is set and the user has not changed an IP address to a correct one, data is kept transmitted to a wrong IP address. In the second embodiment, to prevent the permanent transfer processing, whether transfer conditions are satisfied is determined in transfer from log information held in each of the print control apparatus and printing apparatus. Transfer condition confirmation processing added in the second embodiment, and its UI will be explained.

<Transfer Upper Limit Processing Sequence>

Figure 11:
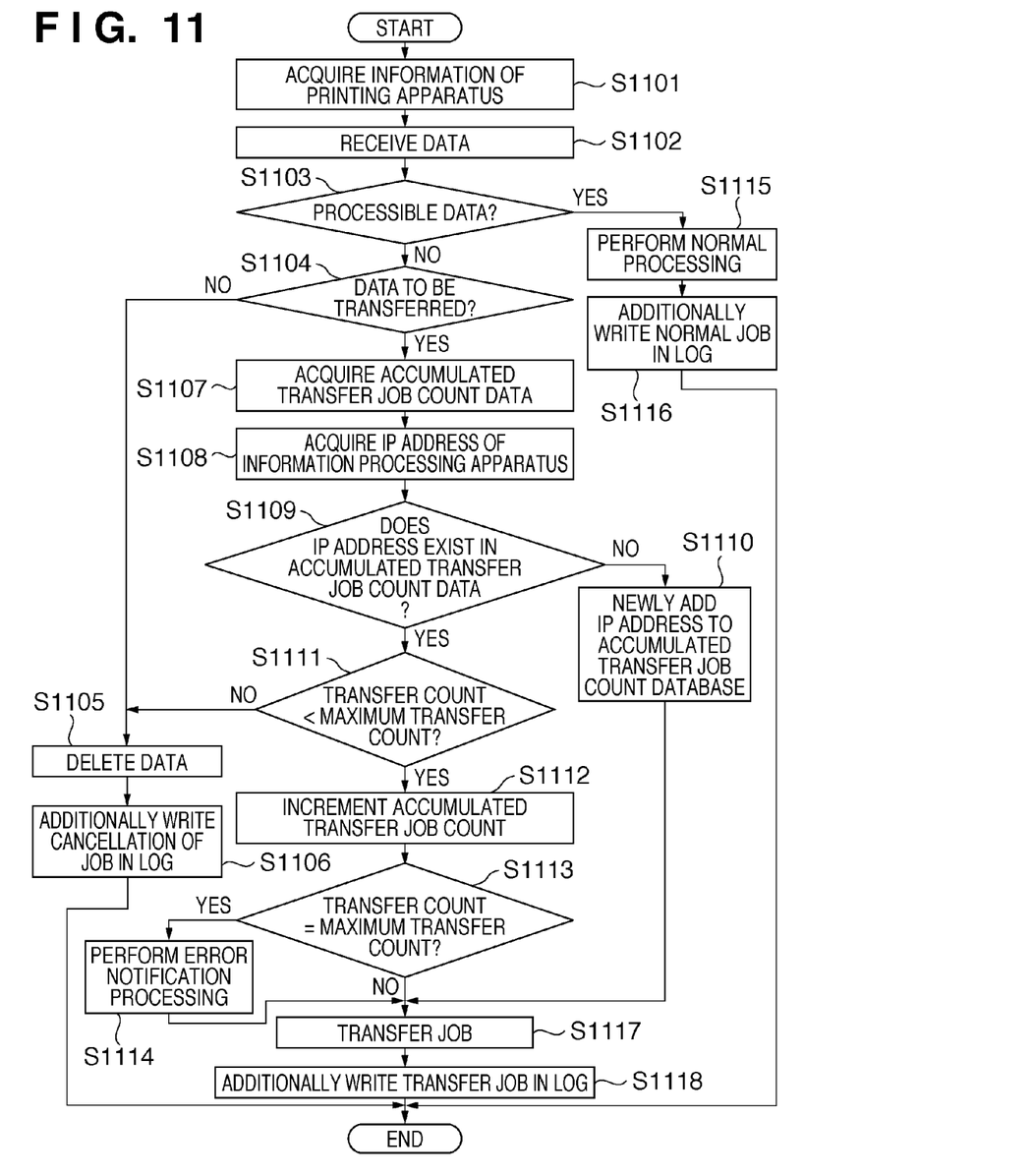
FIG. 11 is a flowchart showing processing procedures to confirm transfer conditions and transfer data.

FIG. 11 is a flowchart showing the procedures of the transfer condition confirmation processing. This example also describes transfer processing procedures when a print control apparatus 101 receives data which should be originally processed by a printing apparatus 103. In S1101, the print control apparatus 101 acquires apparatus information of the printing apparatus. In S1102, the print control apparatus 101 receives print data. In S1103, the print control apparatus 101 determines, based on the information acquired in S1101, whether the received print data is data processible by the print control apparatus 101 or data processible by the connected printing apparatus 103. If the print control apparatus 101 determines that it can process the received print data, it advances to S1115. In S1115, the print control apparatus 101 performs normal processing as a processible job. In S1116, the print control apparatus 101 additionally writes the processing of the normal job in the log.

If the print control apparatus 101 determines that it cannot process the received print data, it advances to S1104. In S1104, the print control apparatus 101 determines whether to transfer the data. The determination criterion complies with a transfer processing mode setting 701 in FIG. 7. If the print control apparatus 101 determines to transfer the data, it advances to S1107; if NO, to S1105. In S1105, the print control apparatus 101 deletes the received print data. In S1106, the print control apparatus 101 additionally writes the deletion of the data in the log.

In S1107, the print control apparatus 101 acquires accumulated transfer job count data held in a memory or the like. In S1108, the print control apparatus 101 acquires the IP address of the information processing apparatus which has input the data. In S1109, the print control apparatus 101 searches the accumulated transfer job count data acquired in S1107 for the IP address acquired in S1108. If the IP address has already existed in the accumulated transfer job count data, the print control apparatus 101 advances to S1111; if NO, to S1110. In S1110, the print control apparatus 101 newly adds the IP address of an information processing apparatus 102 to the accumulated transfer job count database. In S1111, the print control apparatus 101 compares a transfer count corresponding to the registered IP address with a maximum transfer count (reference value) determined in advance by the system. If the transfer count is lower than the maximum transfer count (lower than the reference value), the print control apparatus 101 advances to S1112; if it has already reached the maximum transfer count, to S1105.

In S1112, the print control apparatus 101 increments the transfer job count by one for the transfer job from the IP address of the information processing apparatus 102 in the accumulated transfer job count database. In S1113, the print control apparatus 101 determines whether the transfer job count incremented in S1112 equals the maximum transfer count. If the print control apparatus 101 determines that the transfer job count equals the maximum transfer count, it advances to S1114; if NO, to S1117. In S1114, the print control apparatus 101 notifies the information processing apparatus 102 that the transfer count has reached the maximum transfer count set in the print control apparatus, and causes it to display a warning that transfer will be inhibited from the next time. In S1117, the print control apparatus 101 transfers the print job to the printing apparatus. In S1118, the print control apparatus 101 additionally writes the transfer of the job in the log of the print control apparatus 101.

Figure 12:
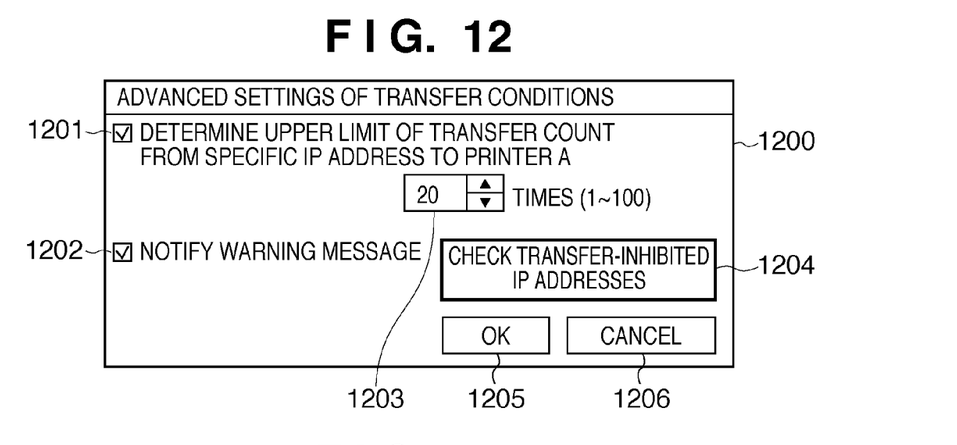
FIG. 12 is a view showing a window for setting transfer conditions.

A window 1200 shown in FIG. 12 is a setup window displayed upon pressing an advanced setting button 805. A setting 1201 is used to designate whether to set the upper limit of the count of transfer to the printing apparatus 103 for the IP address of a specific information processing apparatus. A setting 1203 is used to set the upper limit. A setting 1202 is used to set whether to notify the information processing apparatus 102 of a warning when the transfer count has reached the upper limit. A transfer-inhibited IP address check button 1204 is pressed to display a transfer-inhibited IP address list window shown in FIG. 13. An OK button 1205 is used to set items selected in the window 1200 and close the setup window. A button 1206 is used to invalidate selected items.

Figure 13:
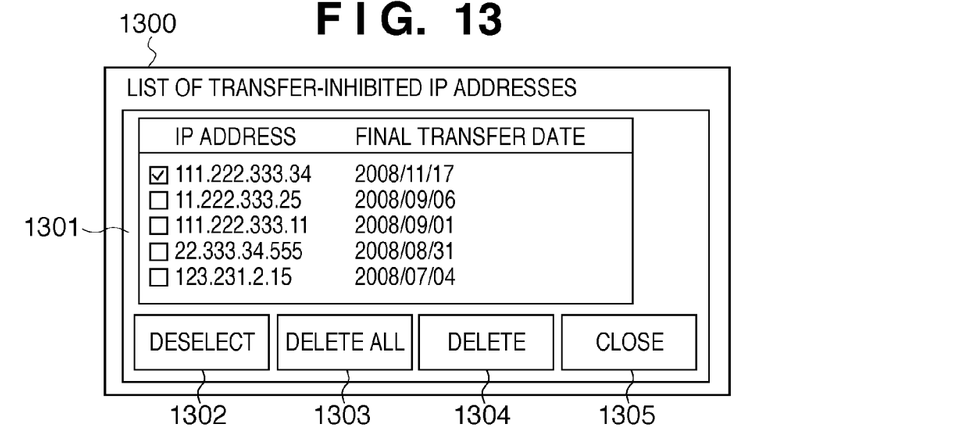
FIG. 13 is a view showing a list of the IP addresses of information processing apparatuses, transfer from which is inhibited.

FIG. 13 shows a window which displays a list of the IP addresses of information processing apparatuses inhibited from transferring data to a printing apparatus. A display 1301 in a window 1300 exhibits IP addresses, transfer processing from which is inhibited, and final transfer dates corresponding to the IP addresses. A button 1302 is used to deselect an IP address selected in a check box from the list in the display 1301. A button 1303 is used to delete all IP addresses displayed in the display 1301. A button 1304 is used to delete an IP address selected in a check box in the display 1301. The transfer count of an IP address in the list can be cleared by deleting the IP address from the list display with the button 1303 or 1304, enabling transfer processing from the IP address again. A close button 1305 is used to close the transfer-inhibited IP address list window and return to the window 1200.

Since the upper limit of the transfer condition of each IP address can be set at the setting 1203, a warning can be displayed to a user who keeps transferring data using a wrong IP address, prompting him to set an IP address again. Accordingly, the print control apparatus need not keep transferring jobs. From the displayed transfer-inhibited IP address list, the administrator and user can confirm the cause of a transfer error at a glance and easily grasp the situation.

Figure 14:
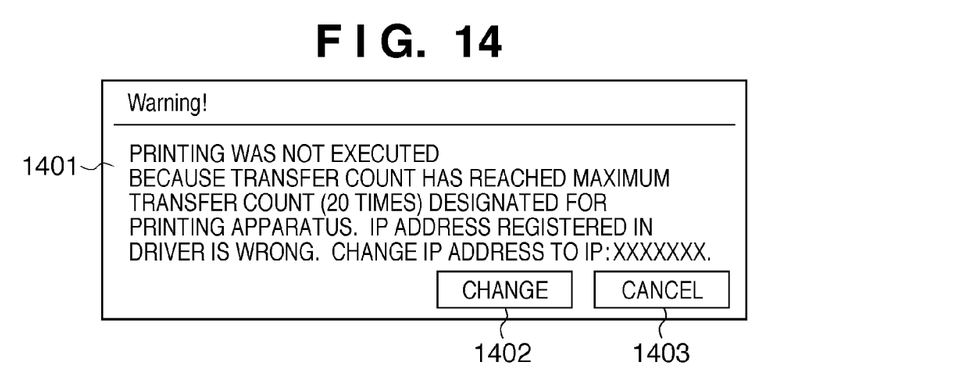
FIG. 14 is a view showing a window displayed when the transfer count has reached the upper limit.

A display 1401 shown in FIG. 14 is an error notification message window displayed when the transfer count has reached the upper limit transfer setting value set at the setting 1203. This window notifies the user that transfer processing, which was possible before, has failed and has been canceled. A button 1402 is used to display an IP address change window, and a cancel button 1403 is used to close the window without changing the IP address.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2009-101378, filed Apr. 17, 2009, which is hereby incorporated by reference herein in its entirety.

What is claimed is:

1. A printing system in which an information processing apparatus that designates print processing for a document, a printing apparatus that prints the document, and a print control apparatus that controls the printing apparatus are connected to each other via a network, the printing apparatus and the print control apparatus being arranged to exchange and acquire unique apparatus information, the system comprising:

in the print control apparatus, a first notification unit configured to determine whether the print control apparatus can process data received from the information processing apparatus, and on a determination that the print control apparatus cannot process the data, the print control apparatus is arranged to transfer the data to the printing apparatus, based on the acquired apparatus information, and to notify the information processing apparatus that the print control apparatus has not processed the data;

in the printing apparatus, a second notification unit configured to determine whether the printing apparatus can process data received from the information processing apparatus, and on a determination that the printing apparatus cannot process the data, the print apparatus is arranged to transfer the data to the print control apparatus, based on the acquired apparatus information, and to notify the information processing apparatus that the printing apparatus has not processed the data;

a memory, for each of the print control apparatus and the printing apparatus, configured to store a count, wherein the count indicates a total count that has been accumulated; and a comparison unit configured to compare the count stored in said memory with a predetermined reference value, wherein on a determination that the print control apparatus is not able to process the data and that a new total count equals the reference value, as a result of the comparison by said comparison unit, said first notification unit is arranged to notify the information processing apparatus that transfer of the data to the printing apparatus will be inhibited when it is determined that the print control apparatus is not able to process the data, and to transfer the data to the printing apparatus based on the acquired apparatus information, wherein the new total count is the total count with an increment, and when on a determination that the printing apparatus is not able to process the data and that a new total count equals the reference value, as a result of the comparison by said comparison unit, said second notification unit is arranged to notify the information processing apparatus that transfer of the data to the print control apparatus will be inhibited when it is determined that the printing apparatus is not able to process the data, and to transfer the data to the print control apparatus based on the acquired apparatus information, wherein the new total count is the total count with an increment.

2. The system according to claim 1, wherein the apparatus information includes an IP address.

3. The system according to claim 1, wherein when either of said first notification unit or said second notification unit notifies the information processing apparatus that the data has not been processed, the printing apparatus is caused to print information indicating that the data has not been processed.

4. A printing method executed in a printing system in which an information processing apparatus that designates print processing for a document,
   a printing apparatus that prints the document, and a print control apparatus that controls the printing apparatus are connected to each other via a network, the method comprising the steps of:
      causing the printing apparatus and the print control apparatus to exchange and acquire unique apparatus information;
      causing the print control apparatus to determine whether the print control apparatus can process data transmitted from the information processing apparatus, and when determining that the print control apparatus cannot process the data, transfer the data to the printing apparatus, based on the acquired apparatus information, and notify the information processing apparatus that the print control apparatus has not processed the data; and
      causing the printing apparatus to determine whether the printing apparatus can process data transmitted from the information processing apparatus, and when determining that the printing apparatus cannot process the data, transfer the data to the print control apparatus, based on the acquired apparatus information, and notify the information processing apparatus that the printing apparatus has not processed the data,
   wherein the printing system further comprises a memory, for each of the print control and the printing apparatus, configured to store a count, wherein the count indicates a total count that has been accumulated, and a comparison unit configured to compare the count stored in said memory with a predetermined reference value,
   wherein on a determination that the print control apparatus is not able to process the data and that a new total count equals the reference value, as a result of the comparison by said comparison unit, said print control apparatus notifies the
information processing apparatus that transfer of the data to the printing apparatus will be inhibited when it is determined that the printing apparatus is not able to process the data, and to transfer the data to the printing apparatus based on the acquired apparatus information, wherein the new total count is the total count with an increment, and
   when on a determination that the printing apparatus is not able to process the data and that a new total count equals the reference value, as a result of the comparison by said comparison unit, said printing apparatus notifies the information processing apparatus that transfer of the data to the print control apparatus will be inhibited when it is determined that the apparatus is not able to process the data, and to transfer the data to the print control apparatus based on the acquired apparatus information, wherein the new total count is the total count with an increment.

\* \* \* \* \*